(12) United States Patent
Kozinsky et al.

(10) Patent No.: US 8,426,052 B2
(45) Date of Patent: Apr. 23, 2013

(54) LI-ION BATTERY WITH POROUS ANODE SUPPORT

(75) Inventors: Boris Kozinsky, Newton, MA (US); John F. Christensen, Mountain View, CA (US); Nalin Chaturvedi, Sunnyvale, CA (US); Jasim Ahmed, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 542 days.

(21) Appl. No.: 12/437,873

(22) Filed: May 8, 2009

(65) Prior Publication Data

US 2010/0285355 A1 Nov. 11, 2010

(51) Int. Cl.
*H01M 2/14* (2006.01)

(52) U.S. Cl.
USPC ... 429/129; 429/209; 429/231.95; 429/231.4; 429/247

(58) Field of Classification Search ............. 429/129, 429/247, 209, 231.95, 231.4
See application file for complete search history.

(56) References Cited

U.S. PATENT DOCUMENTS

| | | | |
|---|---|---|---|
| 4,469,761 A | 9/1984 | Bennett et al. | |
| 5,580,675 A | 12/1996 | Rouhani | |
| 5,814,420 A | 9/1998 | Chu | |
| 6,046,575 A | 4/2000 | Demuro | |
| 6,265,099 B1 | 7/2001 | Gauthier et al. | |
| 6,773,616 B1 | 8/2004 | Chen et al. | |
| 7,029,796 B2 | 4/2006 | Choi et al. | |
| 2001/0018149 A1 | 8/2001 | Yageta et al. | |
| 2004/0151951 A1 | 8/2004 | Hyung et al. | |
| 2004/0214091 A1 | 10/2004 | Lim et al. | |
| 2004/0242804 A1 | 12/2004 | Medsker et al. | |
| 2004/0258997 A1 | 12/2004 | Utsugi et al. | |
| 2005/0014068 A1 | 1/2005 | Takada et al. | |
| 2005/0064282 A1 | 3/2005 | Inagaki et al. | |
| 2005/0064291 A1* | 3/2005 | Sato et al. | 429/233 |
| 2006/0154141 A1 | 7/2006 | Salot et al. | |
| 2006/0216603 A1 | 9/2006 | Choi | |
| 2007/0042267 A1 | 2/2007 | Kim et al. | |
| 2007/0202400 A1 | 8/2007 | Yoshida et al. | |
| 2007/0259255 A1 | 11/2007 | Leysieffer et al. | |
| 2007/0292764 A1 | 12/2007 | Soma et al. | |
| 2008/0044732 A1 | 2/2008 | Salot et al. | |
| 2008/0058194 A1 | 3/2008 | Grader et al. | |

(Continued)

FOREIGN PATENT DOCUMENTS

| | | |
|---|---|---|
| EP | 0997960 | 5/2000 |
| EP | 1050914 | 11/2000 |

(Continued)

OTHER PUBLICATIONS

Christensen, J. and J. Newman, Effect of anode film resistance on the charge/discharge capacity of a lithium-ion battery. Journal of the Electrochemical Society, 2003. 150(11): p. A1416-A1420.

(Continued)

*Primary Examiner* — Jane Rhee
(74) *Attorney, Agent, or Firm* — Maginot, Moore & Beck

(57) ABSTRACT

An electrochemical cell in one embodiment includes a first electrode, and a second electrode spaced apart from the first electrode, the second electrode including, a current collector, an electrically conducting rigid support frame electrically connected to the current collector, and an active material coated to the rigid support frame.

16 Claims, 2 Drawing Sheets

U.S. PATENT DOCUMENTS

| | | | |
|---|---|---|---|
| 2008/0118836 A1* | 5/2008 | Hwang et al. | 429/219 |
| 2008/0280207 A1 | 11/2008 | Patoux et al. | |
| 2009/0042102 A1 | 2/2009 | Cui et al. | |

FOREIGN PATENT DOCUMENTS

| | | |
|---|---|---|
| EP | 1120850 | 8/2001 |
| EP | 1143547 | 10/2001 |
| EP | 1926162 | 5/2008 |
| EP | 2037516 | 3/2009 |
| JP | 6267593 | 9/1994 |
| JP | 10154531 | 6/1998 |
| WO | 9701191 | 1/1997 |
| WO | 2005076389 | 8/2005 |
| WO | 2008002626 | 1/2008 |
| WO | 2009108731 | 9/2009 |

OTHER PUBLICATIONS

Christensen, J. and J. Newman, Cyclable Lithium and Capacity Loss in Li-Ion Cells. Journal of the Electrochemical Society, 2005. 152(4): p. A818-A829.

Amatucci, G.G. and N. Pereira, Flouride based electrode materials for advanced energy storage devices. Journal of Flourine Chemistry, 2007. 128(4):p. 243-262.

Mikhaylik, Y. Fundamental Chemistry of Sion Power Li/S Battery, in International Battery Association and Hawaii Battery Conference. 2006. Waikoloa, HI.

Wang, J., L. Liu, Z. Ling, J. Yang, C. Wan, and C. Jiang, Polymer lithium cells with sulfur composites as cathode materials. Electrochimica Acta, 2003. 48(13): p. 1861-1867.

Shim, J., K.A. Striebel, and E.J. Cairns, the Lithium/Sulfur Rechargeable Cell. Journal of the Electrochemical Society, 2002. 149: p. A1321.

Doughty, D.H., D.L Coleman, and M.J. Berry. Abuse Tolerance Studies on Lithium-Sulfur (Li-S) Rechargeable Batteries. In 43 Power Sources Conference. 2008, Philadelphia, PA.

Schrock, R.R., Catalytic Reduction of Dinitrogen to Ammonia at a Single Molybdenum Center. Accounts of Chemical Research, 2005. 38(12): p. 955-962.

Limthongkul et al., Electrochemically-driven solid-state amorphization in lithium-silicon alloys and implications for lithium storage, Acta Materialia 51 (2003), pp. 1103-1113.

Cui et al., Crystalline-Amorphous Core-Shell Silicon Nanowires for High Capacity and High Current Battery Electrodes, Nano Lett, 2009, pp. 491-495.

International Search Report in corresponding PCT application (i.e., PCT/US2010/033957), dated Aug. 8, 2010 (5 pages).

* cited by examiner

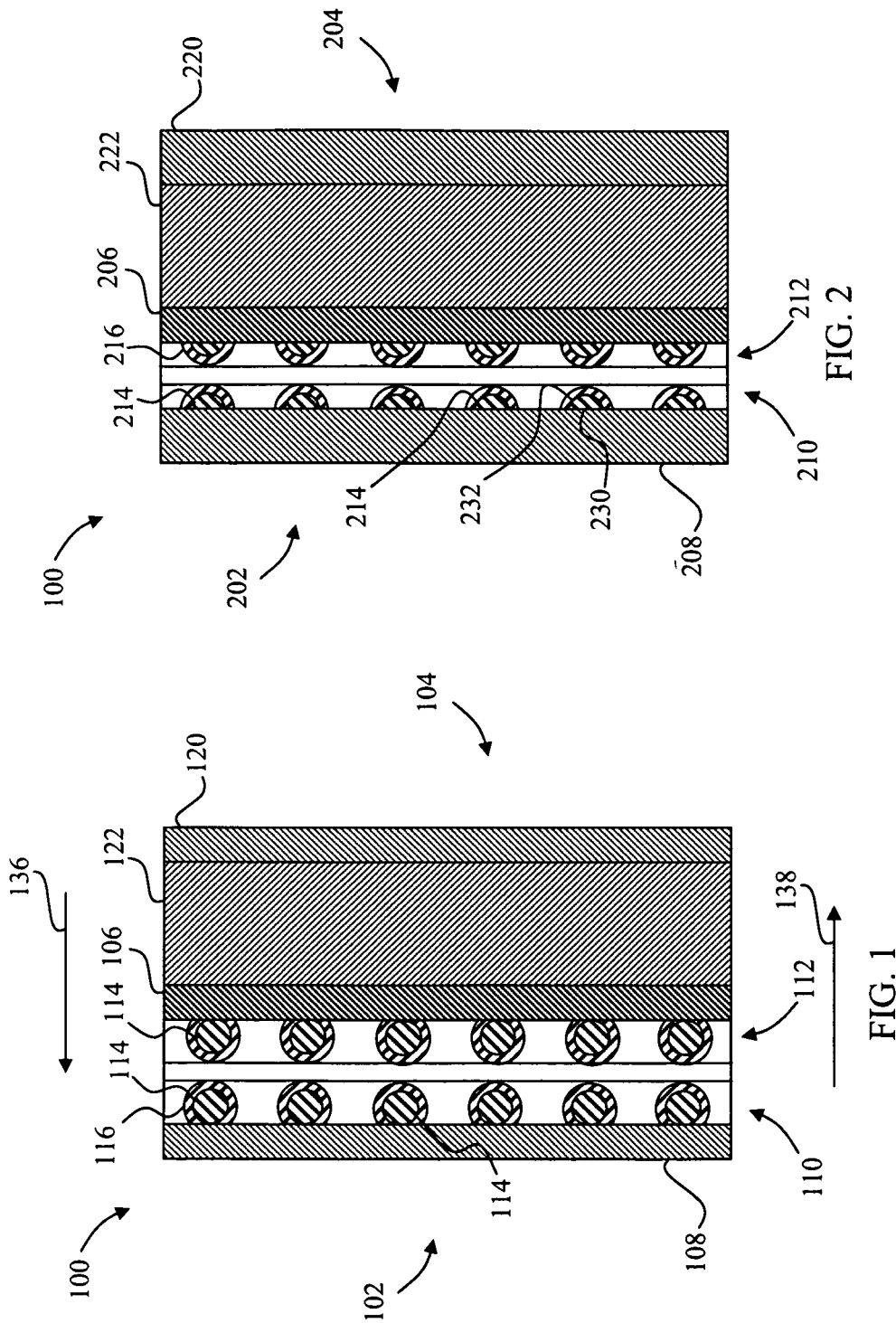

LI-ION BATTERY WITH POROUS ANODE SUPPORT

Cross-reference is made to U.S. Utility patent application Ser. No. 12/437,576 entitled "Li-ion Battery with Selective Moderating Material" by John F. Christensen et al., which was filed on May 8, 2009; U.S. Utility patent application Ser. No. 12/437,592 entitled "Li-ion Battery with Blended Electrode" by John F. Christensen et al., which was filed on May 8, 2009; U.S. Utility patent application Ser. No. 12/437,606 entitled "Li-ion Battery with Variable Volume Reservoir" by John F. Christensen et al., which was filed on May 8, 2009; U.S. Utility patent application Ser. No. 12/437,622 entitled "Li-ion Battery with Over-charge/Over-discharge Failsafe" by John F. Christensen et al., which was filed on May 8, 2009; U.S. Utility patent application Ser. No. 12/437,643 entitled "System and Method for Pressure Determination in a Li-ion Battery" by John F. Christensen et al., which was filed on May 8, 2009; U.S. Utility patent application Ser. No. 12/437,745 entitled "Li-ion Battery with Load Leveler" by John F. Christensen et al., which was filed on May 8, 2009; U.S. Utility patent application Ser. No. 12/437,774 entitled "Li-ion Battery with Anode Coating" by Boris Kozinsky et al., which was filed on May 8, 2009; U.S. Utility patent application Ser. No. 12/437,791 entitled "Li-ion Battery with Anode Expansion Area" by Boris Kozinsky et al., which was filed on May 8, 2009; U.S. Utility patent application Ser. No. 12/437,822 entitled "Li-ion Battery with Porous Silicon Anode" by Boris Kozinsky et al., which was filed on May 8, 2009; U.S. Utility patent application Ser. No. 12/463,024 entitled "System and Method for Charging and Discharging a Li-ion Battery" by Nalin Chaturvedi et al., which was filed on May 8, 2009; and U.S. Utility patent application Ser. No. 12/463,092 entitled "System and Method for Charging and Discharging a Li-ion Battery Pack" by Nalin Chaturvedi et al., which was filed on May 8, 2009, the entirety of each of which is incorporated herein by reference. The principles of the present invention may be combined with features disclosed in those patent applications.

FIELD OF THE INVENTION

This invention relates to batteries and more particularly to lithium-ion batteries.

BACKGROUND

Batteries are a useful source of stored energy that can be incorporated into a number of systems. Rechargeable lithium-ion batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (in Wh/kg) and energy density (in Wh/L) compared to batteries with conventional carbonaceous negative electrodes.

When high-specific-capacity negative electrodes such as lithium are used in a battery, the maximum benefit of the capacity increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices*. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Lithium/sulfur (Li/S) batteries are particularly attractive because of the balance between high specific energy (i.e., >350 Wh/kg has been demonstrated), rate capability, and cycle life (>50 cycles). Only lithium/air batteries have a higher theoretical specific energy. Lithium/air batteries, however, have very limited rechargeability and are still considered primary batteries.

Li/S batteries also have limitations. By way of example, the United States Advanced Battery Consortium has established a goal of >1000 cycles for batteries used in powering an electric vehicle. Li/S batteries, however, exhibit relatively high capacity fade, thereby limiting the useful lifespan of Li/S batteries.

One mechanism which may contribute to capacity fade of Li/S batteries is the manner in which the sulfur reacts with lithium. In general, sulfur reacts with lithium ions during battery discharge to form polysulfides ($Li_xS$), which may be soluble in the electrolyte. These polysulfides react further with lithium (i.e., the value of x increases from ¼ to ⅓ to ½ to 1) until $Li_2S_2$ is formed, which reacts rapidly to form $Li_2S$. In Li/S batteries described in the literature, both $Li_2S_2$ and $Li_2S$ are generally insoluble in the electrolyte. Hence, in a system in which intermediate polysulfides are soluble, each complete cycle consists of soluble-solid phase changes, which may impact the integrity of the composite electrode structure.

Specifically, $Li_2S$ may deposit preferentially near the separator when the current through the depth of the positive electrode is non-uniform. Non-uniformity is particularly problematic at high discharge rates. Any such preferential deposition can block pores of the electrode, putting stress on the electronically conducting matrix and/or isolating an area from the composite electrode. All of these processes may lead to capacity fade or impedance rise in the battery.

Moreover, soluble polysulfides are mobile in the electrolyte and, depending on the type of separator that is used, may diffuse to the negative electrode where the soluble polysulfides may becoming more lithiated through reactions with the lithium electrode. The lithiated polysulfide may then diffuse back through the separator to the positive electrode where some of the lithium is passed to less lithiated polysulfides. This overall shuttle process of lithium from the negative electrode to the positive electrode by polysulfides is a mechanism of self discharge which reduces the cycling efficiency of the battery and which may lead to permanent capacity loss.

Some attempts to mitigate capacity fade of Li/S batteries rely upon immobilization of the sulfur in the positive electrode via a polymer encapsulation or the use of a high-molecular weight solvent system in which polysulfides do not dissolve. In these batteries, the phase change and self-discharge characteristics inherent in the above-described Li/S system are eliminated. These systems have a higher demonstrated cycle life at the expense of high rate capability and capacity utilization.

In the case of a Li/S battery, however, the sulfur active material increases in volume by ~80% as it becomes lithiated during battery discharge. Thus, an all solid-state cathode, composed of sulfur (or lithiated sulfur) and a mixed conducting material, particularly if the latter is a ceramic, is susceptible to fracture due to the volume change upon battery cycling. Fracture of the cathode can result in capacity fade and is a potential safety hazard due to venting of the cell. Other materials which exhibit desired capabilities when incorporated into a battery also exhibit significant increases in volume. By way of example, LiSi, typically used as an anode material, exhibits a large increase in volume during operation.

What is needed therefore is a battery that provides the benefits of materials that exhibit large volume changes during operation of the cell while reducing the likelihood of fracture of material or internal shorts within the cell.

SUMMARY

In accordance with one embodiment an electrochemical cell includes a first electrode, and a second electrode spaced apart from the first electrode, the second electrode including, a current collector, an electrically conducting rigid support frame electrically connected to the current collector, and an active material coated to the rigid support frame.

In accordance with another embodiment, an electrochemical cell includes a first electrode, and a second electrode spaced apart from the first electrode, the second electrode including, a current collector, an electrically conducting first support wall electrically connected to the current collector, an electrically conducting second support wall spaced apart from the first support wall and electrically connected to first support wall, and an active material coated to the first support wall and the second support wall.

BRIEF DESCRIPTION OF THE DRAWINGS

FIG. 1 depicts a schematic of a lithium ion cell including a cathode and an anode with a rigid framework of nanowires;

FIG. 2 depicts a schematic of a lithium ion cell including a cathode and an anode with a rigid framework configured to provide directional lithium ion coating of the framework;

DESCRIPTION

Figures 3, 4:
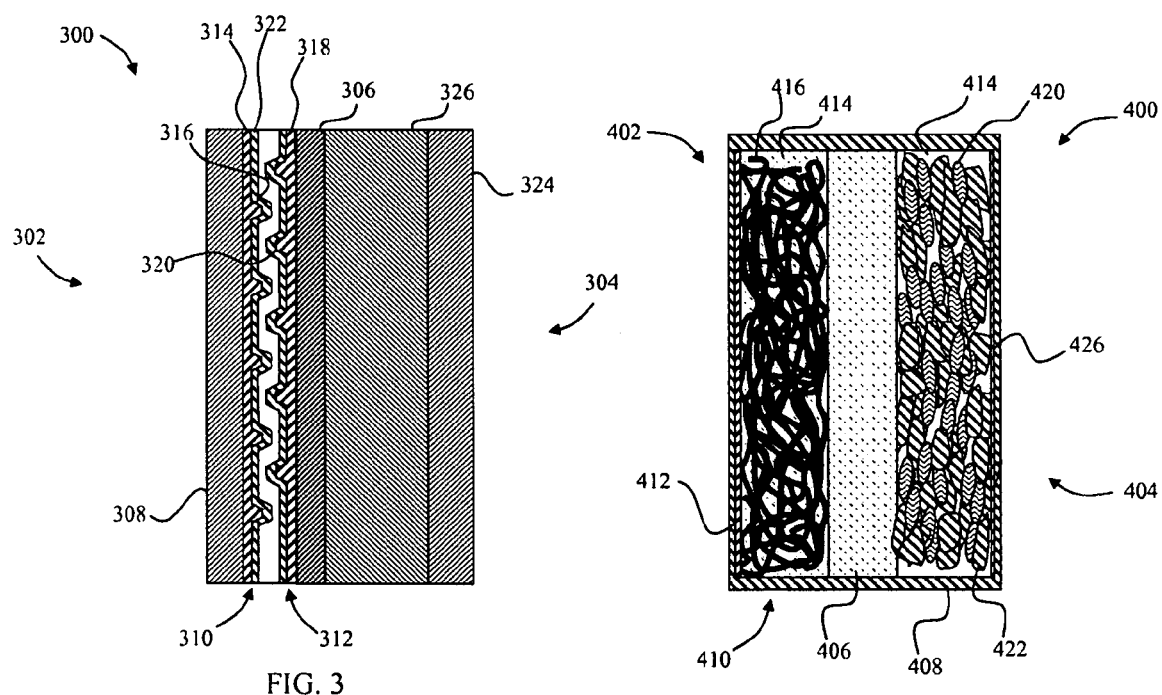
FIG. 3 depicts a schematic of another embodiment of a lithium ion cell including a cathode and an anode with a rigid framework configured to provide directional lithium ion coating of the framework.
FIG. 4 depicts a schematic of another embodiment of a lithium ion cell including a cathode and an anode with a rigid framework configured to provide directional lithium ion coating of the framework.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 depicts a lithium-ion cell 100, which includes a negative electrode 102, a positive electrode 104, and a separator region 106 between the negative electrode 102 and the positive electrode 104. The negative electrode 102 includes a current collector 108. A first support wall 110 is attached to the current collector 108 on one side while the other side of the support wall 110 faces and is spaced apart from another support wall 112.

The first support wall 110 and the second support wall 112 are formed from nanotubes, nanowires, or conducting fibers such as carbon 114 which in this embodiment are formed as a grid from a material onto which lithium 116 plates, although other materials such as graphite particles may be used. The first support wall 110 and the second support wall 112 are connected such that lithium ions can migrate between the support walls 110 and 112. In one embodiment, a single ply of woven material is folded to provide facing surfaces of the support walls 110 and 112. In one alternative embodiment, a solid LI-ion conductor, such as lithium phosphate, lisicon, a lithium-conducting polymer or glass, is used to create connections between support structures for lithium migration. In a further embodiment, an electrolyte is used within the electrode 102 to provide a transfer path. The support walls 110 and 112 may be spaced apart as depicted in FIG. 1 or they may be in contact with the other support wall 110 or 112 along the facing surfaces.

The separator region 106 includes an electrolyte with a lithium cation and serves as a physical and electrical barrier between the negative electrode 102 and the positive electrode 104 so that the electrodes are not electronically connected within the cell 100 while allowing transfer of lithium ions between the negative electrode 102 and the positive electrode 104.

The positive electrode 104 includes a current collector 120 and an active portion 122 into which lithium can be inserted. The active portion 122 may include a form of sulfur and may be entirely sulfur. If desired, the positive electrode 104 may include a support structure similar to the support walls 110 and 112.

The lithium-ion cell 100 operates in a manner similar to the lithium-ion battery cell disclosed in U.S. patent application Ser. No. 11/477,404, filed on Jun. 28, 2006, the contents of which are herein incorporated in their entirety by reference. In general, electrons are generated at the negative electrode 102 during discharging and an equal amount of electrons are consumed at the positive electrode 104 as lithium and electrons move in the direction of the arrow 136 of FIG. 1.

In the ideal discharging of the cell 100, the electrons are generated at the negative electrode 102 because there is extraction via oxidation of lithium ions from the lithium 116 plated on the nanowires 114 of the negative electrode 102, and the electrons are consumed at the positive electrode 104 because metal cations or sulfur ions change oxidation state in the positive electrode 104. During charging, the reactions are reversed, with lithium and electrons moving in the direction of the arrow 138.

As lithium ions are inserted into the active portion 122, the volume of the active portion 122 increases. As the volume of the active portion 122 increases, the pressure within the positive electrode 104 increases. The increased pressure in the positive electrode 104, in embodiments incorporating a fluid such as a fluid electrolyte, causes the fluid to flow toward the negative electrode 102. Because the nanowires 114 do not fill the entire negative electrode 102, the fluid can flow into the negative electrode 102. The rigid support walls 110 and 112 thus provide an expansion volume within the negative electrode 102. Additionally, the rigidity of the support structures 110 and 112 protects the active material in the electrode 102 from the volume change in the positive electrode 104.

As lithium plates onto the nanowires 114, the lithium 116 may plate predominantly in directions toward another nanowire 114. Specifically, since one side of the rigid wall 110 is mounted to the current collector 108, lithium will not plate onto that surface portion. Thus, plating of lithium on the support wall 110 occurs predominantly on the sides of the nanowires 114 facing other nanowires 114 within the support wall 110 or nanowires 114 in the opposing support wall 112. Likewise, since one side of the nanowires 114 in the rigid wall 112 is attached to the separator layer 106, lithium will not plate onto that surface portion. Thus, plating of lithium on the support wall 112 occurs predominantly on the sides of the nanowires 114 facing other nanowires 114 within the support wall 112 or nanowires 114 in the opposing support wall 110.

Accordingly, any deformation of the lithium layer 116 on the support wall 110 will typically occur in a direction that is not directly toward the current collector 108 and any deformation of the lithium layer 116 on the support wall 110 will typically occur in a direction that is not directly toward the separator layer 106. Thus, deformation or dendrites must extend for a significantly longer distance before any significant deleterious effects on the current collector 108 or the separator layer 106 are generated.

The benefits of providing a rigid support wall that provides protection of active material from volume changes within the cell and which may promote directional plating of lithium can be increased by modifying the shape of the rigid support structure members. By way of example, FIG. 2 depicts a lithium-ion cell 200 which includes a negative electrode 202, a positive electrode 204, and a separator layer 206 between the negative electrode 202 and the positive electrode 204. The negative electrode 202 includes a current collector 208. A first support wall 210 is attached to the current collector 208 on one side while the other side of the support wall 210 faces and is spaced apart from another support wall 212.

The first support wall 210 and the second support wall 212 are formed from shaped nanowires 214 which in this embodiment are formed as a grid from a material onto which lithium 216 plates. The first support wall 210 and the second support wall 212 are connected such that lithium ions can migrate between the support walls 210 and 212.

The separator layer 206 is a lithium conductor and serves as a physical and electrical barrier between the negative electrode 202 and the positive electrode 204 so that the electrodes are not electronically connected within the cell 200 while allowing transfer of lithium ions between the negative electrode 202 and the positive electrode 204. The positive electrode 204 includes a current collector 220 and an active portion 222 into which lithium ions can be inserted.

The lithium-ion cell 200 operates in a manner similar to the lithium-ion battery cell 100. The nanowires 214 of the lithium-ion cell 200 are formed, however, to increase the effect of directional plating as compared to the nanowires 114 of the lithium-ion cell 100. To this end, the nanowires 214 include a mounting surface 230 attached to either the current collector 208 or to the separator layer 206, and a plating surface 232 on which lithium is allowed to plate. The plating or active surface 232 is configured such that the plating surface 232 does not face the surface on which the nanowire 214 is mounted. Thus, plating of lithium 216 onto the nanowires 214 occurs in a direction away from the surface on which the nanowires 214 are mounted.

The inclusion of a rigid framework may increase the necessary volume for a particular cell. The increased volume may be minimized by selective spacing and shaping of the members used to form the support walls. FIG. 3, for example, depicts a lithium-ion cell 300 which includes a negative electrode 302, a positive electrode 304, and an electrolyte layer 306 between the negative electrode 302 and the positive electrode 304. The negative electrode 302 includes a current collector 308. A first support wall 310 is attached to the current collector 308 on one side while the other side of the support wall 310 faces and is spaced apart from another support wall 312 which is connected to the electrolyte layer 306.

The first support wall 310 is formed as a solid base portion 314 from which shaped protrusions 316 extend. The second support wall 312 is formed from shaped wires 318 which in this embodiment are formed into a grid which may include openings to the electrolyte layer 306. Shaped plating surfaces 320 are supported by the wires 318 and extend toward the support wall 310. Both the support wall 310 and the support wall 312 are formed from a material onto which lithium 322 plates. The support wall 310 and the support wall 312 may be shaped using semiconductor chip forming processes or other manufacturing processes. The first support wall 310 and the second support wall 312 are connected such that lithium ions can migrate between the support walls 310 and 312.

The electrolyte layer 306 includes an electrolyte with a lithium cation and serves as a physical and electrical barrier between the negative electrode 302 and the positive electrode 304 so that the electrodes are not electronically connected within the cell 300 while allowing transfer of lithium ions between the negative electrode 302 and the positive electrode 304. The positive electrode 304 includes a current collector 324 and an active portion 326 into which lithium can be inserted.

The lithium-ion cell 300 operates in a manner similar to the lithium-ion battery cell 200. The support wall 310 and the support wall 312 of the lithium-ion cell 300 are formed to increase the effect of directional plating like the nanowires 214 of the lithium-ion cell 200. The controlled manufacturing process used to form the support walls 310 and 312, however, ensure a more uniform distance between the plating surfaces of support wall 310 and the support wall 312 and any other surface in the cell 300. Accordingly, usefulness of the space within the electrode 302 is optimized. Moreover, the support wall 310 and the support wall 312 are formed to allow interlacing of plating surfaces to further minimize space requirements.

While the foregoing embodiments incorporate wall structures which are highly ordered, a wall structure with randomly oriented support members may be used. To this end, FIG. 4 depicts a lithium-ion cell 400, which includes a negative electrode 402, a positive electrode 404, and a separator region 406 between the negative electrode 402 and the positive electrode 404. The negative electrode 402, the positive electrode 404, and the separator region 406 are located within a pouch 408.

The negative electrode 402 includes a support structure 410 which is in electrical contact with a current collector 412 and an electrolyte 414. The support structure 410 is made from nanotubes or nanowires 416 which in this embodiment are a conductive mixture onto which lithium or some other active material can plate. The conductive material in the nanowires 416 may include carbon. The nanowires 416 are randomly oriented. Random orientation may be obtained, for example, by drying of a slurry incorporating a plurality of nanowires 416. Once dried, the nanowires 416 may be compacted to reduce porosity.

The separator region 406 in one embodiment includes an electrolyte with a lithium cation and serves as a physical and electrical barrier between the negative electrode 402 and the positive electrode 404 so that the electrodes are not electronically connected within the cell 400 while allowing transfer of lithium ions between the negative electrode 402 and the positive electrode 404.

The positive electrode 404 includes active material 420 into which lithium can be inserted, inert material 422, the electrolyte 414, and a current collector 426. The active material 420 includes a form of sulfur and may be entirely sulfur.

The lithium-ion cell 400 operates in a manner similar to the lithium-ion battery cells 100, 200, and 300. Although the nanowires 416 are randomly oriented, most of the active surfaces of the nanowires 416 are either spaced away from the outer walls of the nanowire support structure 410 or oriented away from an immediately adjacent structure such as the current collector 412. Accordingly, while providing a substantial volume occupied only by electrolyte 414 which can easily be displaced as active material plates onto the support structure 410, any dendrite formation is less likely to establish an internal short.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. An electrochemical cell comprising:
a first electrode; and
a second electrode spaced apart from the first electrode, the second electrode including,
a current collector,
an electrically conducting rigid support frame electrically connected to the current collector, and
an active material coated to the rigid support frame,
wherein the rigid support frame comprises at least one support member, the at least one support member including a mounting portion for attachment to the surface of the current collector and a plating surface upon which a form of lithium is coated, wherein the plating surface at a location closest to the current collector extends away from the surface of the current collector at an obtuse angle, and wherein the rigid support frame comprises a first plurality of nanowires.

2. The electrochemical cell of claim 1, wherein the first plurality of nanowires comprises a plurality of carbon nanowires.

3. The electrochemical cell of claim 1, further comprising: a second plurality of nanowires, wherein the first plurality of nanowires and the second plurality of nanowires are configured as two opposing support walls.

4. The electrochemical cell of claim 3, wherein the active material is a form of lithium.

5. An electrochemical cell, comprising:
a first electrode; and
a second electrode spaced apart from the first electrode, the second electrode including,
a current collector,
an electrically conducting first support wall electrically connected to the current collector, the first support wall including a substantially solid base portion in contact with the current collector and a plurality of first plating surfaces extending away from the base portion and away from the current collector,
an electrically conducting second support wall spaced apart from the first support wall and electrically connected to first support wall, and
an active material coated to the first support wall and the second support wall.

6. The electrochemical cell of claim 5, wherein the second support wall comprises a plurality of nanowires.

7. The electrochemical cell of claim 6, wherein the plurality of nanowires comprises carbon nanowires.

8. The electrochemical cell of claim 5, wherein the first electrode comprises a form of sulfur.

9. The electrochemical cell of claim 5, wherein the second support wall is affixed to a surface of a layer positioned between the first electrode and the second electrode.

10. The electrochemical cell of claim 9, wherein:
each of the plurality of first plating surfaces at a location closest to the current collector extend away from the surface of the current collector at an obtuse angle;
the second support wall comprises a second plurality of support members, each of the second plurality of support members including a second mounting portion for attachment to the surface of the layer, and a second plating surface upon which the form of lithium is coated; and
each of the second plating surfaces extend away from the surface of the layer at an obtuse angle.

11. The electrochemical cell of claim 10, wherein each of the plurality of first plating surfaces and the second plating surfaces comprise at least one planar surface.

12. The electrochemical cell of claim 11, wherein each of the plurality of first plating surfaces and the second plating surfaces comprise a first planar surface and a second planar surface.

13. The electrochemical cell of claim 5, wherein:
the first support wall includes a first side coated with a form of lithium;
the second support wall includes a second side coated with the form of lithium; and
the first side faces the second side.

14. An electrochemical cell, comprising:
a first electrode; and
a second electrode spaced apart from the first electrode, the second electrode including,
a current collector,
an electrically conducting rigid support frame electrically connected to the current collector, and
an active material coated to the rigid support frame,
wherein the rigid support frame comprises at least one support member, the at least one support member including a mounting portion for attachment to the surface of the current collector and a plating surface upon which a form of lithium is coated, wherein the plating surface at a location closest to the current collector extends away from the surface of the current collector at an obtuse angle, and wherein the rigid support frame comprises:
a substantially solid base portion in contact with the current collector; and
a plurality of protrusions extending away from the base portion and away from the current collector.

15. The electrochemical cell of claim 14, wherein the plating surface comprises at least one planar surface.

16. The electrochemical cell of claim 15, wherein the plating surface comprises a first planar surface and a second planar surface.

* * * * *